UNITED STATES PATENT OFFICE.

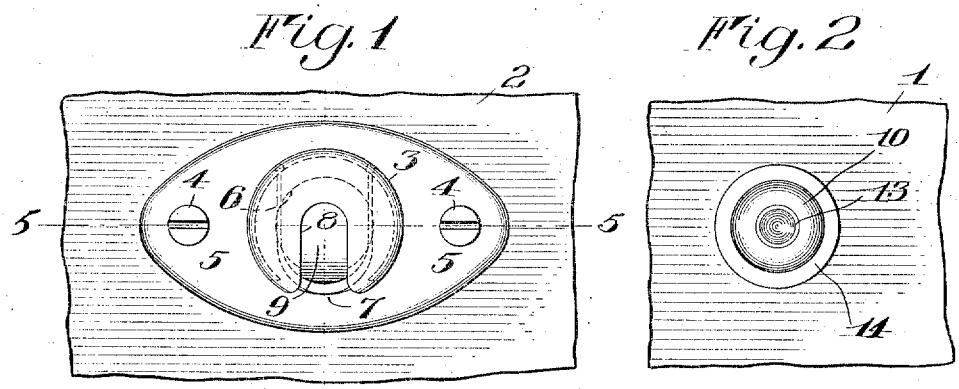
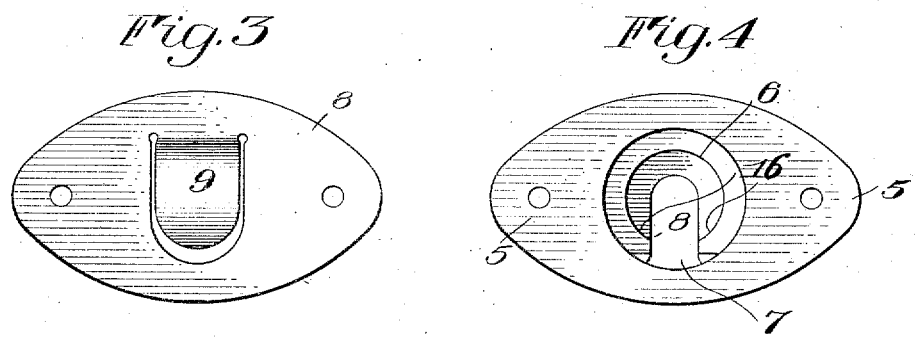
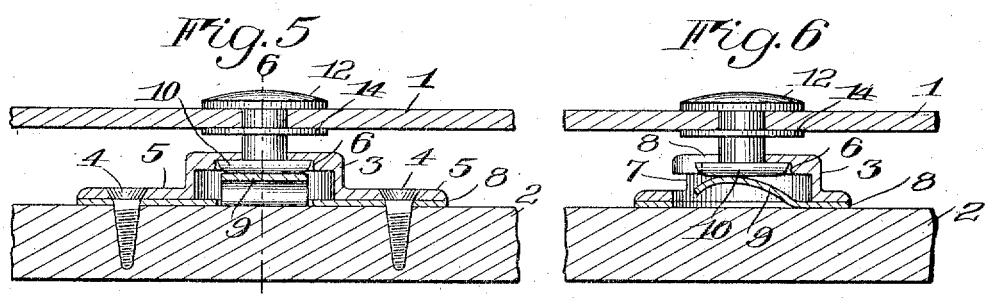
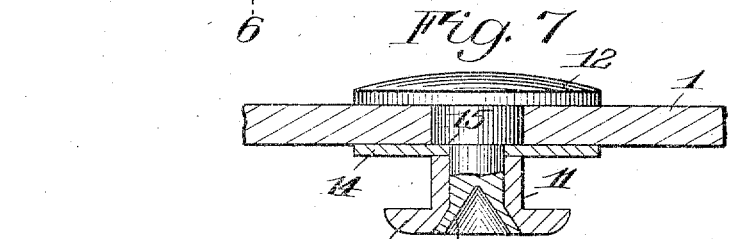

WILLIAM F. FOLMER, OF ROCHESTER, NEW YORK.

SNAP-FASTENER.

1,252,255.

Specification of Letters Patent.  Patented Jan. 1, 1918.

Application filed July 5, 1917. Serial No. 178,701.

*To all whom it may concern:*

Be it known that I, WILLIAM F. FOLMER, of Rochester, in the county of Monroe and State of New York, have invented certain new and useful Improvements in Snap-Fasteners; and I ho hereby declare the following to be a full, clear, and exact description of the same, reference being had to the accompanying drawings, forming a part of this specification, and to the reference-numerals marked thereon.

My present invention relates to fastening devices of an attachable nature such as are used upon automobile curtains and in other instances where it is desired to temporarily attach two fabrics or flexible sheets together and the invention has for its object to provide a simple, strong and durable snap fastener of this character the parts of which can be engaged and disengaged with great convenience and when in coöperation with each other are prepared to resist considerable strain. To these and other ends the invention resides in certain improvements and combinations of parts, all as will be hereinafter more fully described, the novel features being pointed out in the claims at the end of the specification.

In the drawings:

Figure 1 is a plan view of the socket member of a fastening device constructed in accordance with and illustrating one embodiment of my invention;

Fig. 2 is a similar view of the button or other attaching part;

Fig. 3 is a plan view of the spring plate;

Fig. 4 is a bottom plan view of the socket member;

Fig. 5 is a section on the line 5—5 of Fig. 1 showing the two parts of the fastener engaged;

Fig. 6 is a section on the line 6—6 of Fig. 5, and

Fig. 7 is a section through the button, enlarged and partly in elevation.

Similar reference numerals throughout the several views indicate the same parts.

Referring more particularly to the drawings, 1 indicates a fragment of a curtain, in the present instance, and 2 a fragment of a support to which it is to be temporarily fastened. One of the fastening elements 3 is secured to the support 2 and consists of a turret-shaped hollow socket member the body of which is offset from the support and is fixed thereto by screws 4 passing through flanges 5 at the base of the turret. On its under side the socket is provided with a circular recess 6 to which access may be had in a lateral direction through an opening 7 in the side of the turret in connection with a slot 8 in the top thereof. Beneath the socket and the attaching flanges 5 thereof and secured to the support 2 by the same fasteners 4, is a spring plate 8 shown in Fig. 3. Centrally of this plate a spring tongue 9 is struck from the material thereof to present a rounded surface in the direction of the recess 6 directly beneath the slot 8, as shown in Fig. 6.

The other attaching element that is carried on the curtain 1 consists of a button having a circular head 10 and a shank or stem 11. In the present instance, the button is secured to the curtain by means of a rivet 12 extending through the head 10 of the stem 11 and expanded or upset at 13. A washer 14 is preferably interposed between the stem 11 and a shoulder 15 on the rivet.

To attach the curtain 1 to the support 2 the button is passed laterally into the turret-shaped socket member 3, the head 10 entering through the opening 7 and the stem 11 through the slot 8. The head 10 engages and displaces the spring tongue 9 until opposite the recess 6 when the spring forces the head outwardly into the said recess and locks it there against passage back through the opening 7. While the opening 7 includes part of the lateral wall of the recess 6, the circular nature of these walls provides shoulders 16 (Fig. 4) that retain the head 10 from movement in the direction of the opening because the head closely fits the recess. It will be observed that the head has an extended bearing against the bottom of the recess so that it does not rock or tilt and it is held in this bearing at all times by the spring 9.

To release the button and separate the elements and the fastener a reverse motion is imparted to it, namely, it is pressed straight in to displace the spring 9 and allow the head 10 to clear the recess 6 and the locking shoulders 16 thereof and it is then drawn out laterally through the opening 7 and slot 8.

I claim as my invention:

1. In a snap fastener, the combination with an offset socket member having a lateral opening and a recess in its under side, of a button comprising a stem and a head adapted to be inserted in the opening of the socket member into alinement with the recess and a spring beneath the socket member adapted to be displaced by the entrance of the button and to thereafter thrust the latter into the recess.

2. In a snap fastener, the combination with a turret-shaped socket member having a lateral opening and a circular recess in its under side forming an annular seat, of a button comprising a stem and a circular head adapted to be inserted in the opening of the socket into alinement with the recess, and a spring beneath the socket member adapted to be displaced by the entrance of the button and to thereafter thrust the latter into the annular recess.

3. In a snap fastener, the combination with a turret-shaped socket member having a lateral opening and a circular recess in its under side forming an annular seat, of a button comprising a stem and a circular head adapted to be inserted in the opening of the socket into alinement with the recess, attaching flanges on the socket member at the base of the turret portion thereof, a spring plate beneath the flanges and turret portion adapted to be secured to a support therewith and a spring tongue on the plate beneath the turret portion adapted to be displaced by the entrance of the button and to thereafter thrust the latter into the annular recess.

WILLIAM F. FOLMER.

Witness:
RUSSELL B. GRIFFITH.